(12) United States Patent
Bostick et al.

(10) Patent No.: US 9,898,665 B2
(45) Date of Patent: Feb. 20, 2018

(54) COMPUTERIZED VIDEO FILE ANALYSIS TOOL AND METHOD

(71) Applicant: International Business Machines Corporation, Armonk, NY (US)

(72) Inventors: James Bostick, Cedar Park, TX (US); John Ganci, Jr., Cary, NC (US); Martin Keen, Cary, NC (US); Sarbajit Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 14/927,032

(22) Filed: Oct. 29, 2015

(65) Prior Publication Data
US 2017/0124399 A1    May 4, 2017

(51) Int. Cl.
*H04N 9/80* (2006.01)
*G06K 9/00* (2006.01)
(Continued)

(52) U.S. Cl.
CPC ..... *G06K 9/00744* (2013.01); *G06K 9/00718* (2013.01); *G06K 9/6254* (2013.01);
(Continued)

(58) Field of Classification Search
CPC .......................... G06K 9/00744; G11B 27/005
See application file for complete search history.

(56) References Cited

U.S. PATENT DOCUMENTS 7,391,907 B1   6/2008 Venetianer et al.
7,716,604 B2   5/2010 Kataoka et al.
(Continued)

FOREIGN PATENT DOCUMENTS

| EP | 2720172 A1 | 4/2014 |
| WO | 2008115674 A3 | 9/2008 |
| WO | 2012045317 A1 | 4/2012 |

OTHER PUBLICATIONS

Pessoa et al., "RPR-SORS: Real-time photorealistic rendering of synthetic objects into real scenes," Computers & Graphics, vol. 36, pp. 50-69 (2012).

(Continued)

*Primary Examiner* — Hung Dang
*Assistant Examiner* — Girumsew Wendmagegn
(74) *Attorney, Agent, or Firm* — Weitzman Law Offices, LLC

(57) ABSTRACT

A computer-implemented method for dynamically creating and presenting video content information to a user of a computer having an associated screen involves: i) loading contents of a video file into a video player; ii) displaying frames of the video file; iii) receiving a user's input indicating selection of an object displayed in at least one frame; iv) performing an object identification analysis of frames to locate each instance where a specific frame contains the object; v) for each specific frame that contains the object, performing a z-axis analysis of the object to determine prominence of the object within each specific frame; vi) storing metadata indicating results of the object identification analysis and, for frames where the object was present, the z-axis analysis; and vii) automatically generating and displaying a graphical timeline display graphically reflecting frames containing the object and object prominence within those frames based upon the metadata.

16 Claims, 8 Drawing Sheets

(51) Int. Cl.
    *G11B 27/34*      (2006.01)
    *G11B 27/00*      (2006.01)
    *H04N 21/472*     (2011.01)
    *H04N 21/44*      (2011.01)
    *G06K 9/62*       (2006.01)

(52) U.S. Cl.
    CPC ............ *G11B 27/005* (2013.01); *G11B 27/34* (2013.01); *H04N 21/44008* (2013.01); *H04N 21/47217* (2013.01)

(56) References Cited

U.S. PATENT DOCUMENTS

| | | |
|---|---|---|
| 8,218,819 B2 | 7/2012 | Cobb et al. |
| 8,559,670 B2 | 10/2013 | Wang et al. |
| 2005/0026689 A1 | 2/2005 | Marks |
| 2008/0170123 A1 | 7/2008 | Albertson et al. |
| 2010/0045800 A1 | 2/2010 | Chebil et al. |
| 2011/0107220 A1 | 5/2011 | Perlman |
| 2014/0279192 A1 | 9/2014 | Selby |
| 2014/0328512 A1 | 11/2014 | Gurwicz et al. |
| 2015/0178930 A1 | 6/2015 | Dashan et al. |

OTHER PUBLICATIONS

Sairam, "Tracking Objects in YouTube Videos," http://cvbgl.stanford.edu/teaching/cs231a_winter1415/prev/projects/AparajithSairam.pdf) (Jan. 2015).

COMPUTERIZED VIDEO FILE ANALYSIS TOOL AND METHOD

FIELD OF THE INVENTION

This disclosure relates generally to computerized video analysis tools and, more particularly, to improved computerized video analysis and search tools.

BACKGROUND

As the popularity of online video increases, so do the number of videos hosted on video streaming sites such as, for example, YouTube® and Netflix® to name a few. It is estimated that, on YouTube alone, over 4 billion videos are viewed each day, and that 300 hours of new video are uploaded to YouTube every minute. For users seeking to find specific content in a part of a video, largely gone are the days of simply rewinding and fast forwarding through it. A user seeking to review content in an online video presently has a number of search and scrubbing solutions. Certain video player software allows users to "scrub" through a video (i.e., move through the video timeline typically by dragging a pointer on a slider from left to right) whereby thumbnails of key frames of the video are shown. This enables a user to quickly scan the content of a video to see what is coming up or has gone before. FIG. 1 illustrates, in simplified form, a simplified example of a conventional, prior art video player 100, having a user interface 102, that is running on a processor-containing computer 104 (which could be a smart television, a desktop computer, a laptop computer, a tablet computer, a smart phone, a smart watch, or other computing device capable of playing video for a user in a video player). As is conventional, the computer will contain one or more processors, as well as RAM, ROM, some form of I/O, and non-volatile storage.

As shown in FIG. 1, and as is well known, the user interface 102 of the video player 100 includes interface controls such as a conventional Play/Pause button 106, a fast forward button 108, a rewind button 110, a stop button 112 and one or more auxiliary buttons, for example, a volume control button 114. The user interface 102 also includes a slider 116 via which the user can scrub through a video loaded into, or streaming to, the video player 100.

As shown in FIG. 1, the current video is paused at a point partially through the video, as indicated by a pointer 118 of the slider 116. The current frame of the paused video is displayed within the screen 120 of the video player 100 and shows a human figure 122 in the center, a series of buildings 124a, 124b, 124c, and a balloon 126 floating between the location of the figure 122 and one of the buildings 124a. In addition, the screen 120 contains a timeline 128 of the currently loaded video that includes a series of key frames 130a, 130b, 130c, 130d, 130e, 130f, 130g, 130h, 130i that correspond to some number of frames 130a, 130b, 130c, 130d of the video before the currently-displayed frame 130e and some number of frames 130f, 130g, 130h, 130i of the video after the currently-displayed frame 130e. In addition, with this particular user interface 102, the currently-displayed frame 130e is shown enlarged on the timeline. As can be seen in the subset of key frames 130a, 130b, 130c, 130d, 130e, 130f, 130g, 130h, 130i, the balloon 126 is traversing from the left side of the frame, behind the figure 122 and in front of the buildings 124a, 124b, 124c. If the user wanted to locate where in the video, for example, the balloon is above the second building 124b, they would move the pointer 118 of the slider 116 (in this case simply advance it to the right) until the specific frame 130h was located. Of course, if that frame 130h was not within the displayed portion of the timeline and its specific location was unknown, the user might have to move the pointer 118 back and forth along the slider 116 until the particular frame of interest was located.

While the display of key frames 130a-130i can assist a user in finding a desired part of a video, this type of searching can be time consuming and tedious and presents a problem because this approach is prone to having the user overshoot, or entirely miss, key frames of interest.

The above problem is compounded if the searching is to be done repeatedly for multiple videos. For example, it is presently not uncommon for old films to be digitized so that they can be made more broadly available for various purposes, including scholarly research. In doing so, when digitized, the videos may have some associated information logged for future reference relating to its content, but that information typically only reflects the major focus of the film and may not include minor details that are not noteworthy at the time, or of no interest per se. As a result, it is likewise not uncommon for a later researcher viewing a digitized video to notice someone, or something, previously unnoticed that is later recognized to be of significance, for example, the presence of a person long before they were famous or a detail that may aid in unraveling some long unsolved mystery. Such research efforts can require, a researcher to view countless hours of videos of potentially no relevance at all with the hope that they may possibly contain a few seconds of the desired person(s) or thing(s).

Thus, there is an ongoing and increasing problem involving the ability to more quickly and efficiently perform video searching.

SUMMARY

One aspect of this disclosure involves a computer-implemented method for dynamically creating and presenting video content information to a user of a computer having an associated screen. The method involves: i) using a processor of the computer, loading contents of a video file into a video player, for display in a user interface of the video player on the screen; ii) displaying frames of the video file in the user interface; iii) receiving, via the user interface, a user's input indicating selection of an object displayed in at least one frame of the video file; iv) performing, using the processor, an object identification analysis of frames comprising the video file to locate each instance where a specific frame of the video file contains the object; v) for each specific frame of the video file that contains the object, performing a z-axis analysis of the object within the frame, using the processor, to determine prominence of the object within each specific frame; vi) storing metadata in non-volatile storage associated with the video file, the metadata indicating results of the object identification analysis and, for frames where the object was present, the z-axis analysis; and vii) using the processor, automatically generating and displaying for the video file, on the screen synchronized to the video file, a graphical timeline display for the user graphically reflecting frames of the video file containing the object and object prominence within those frames based upon the metadata.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

Figure 1:
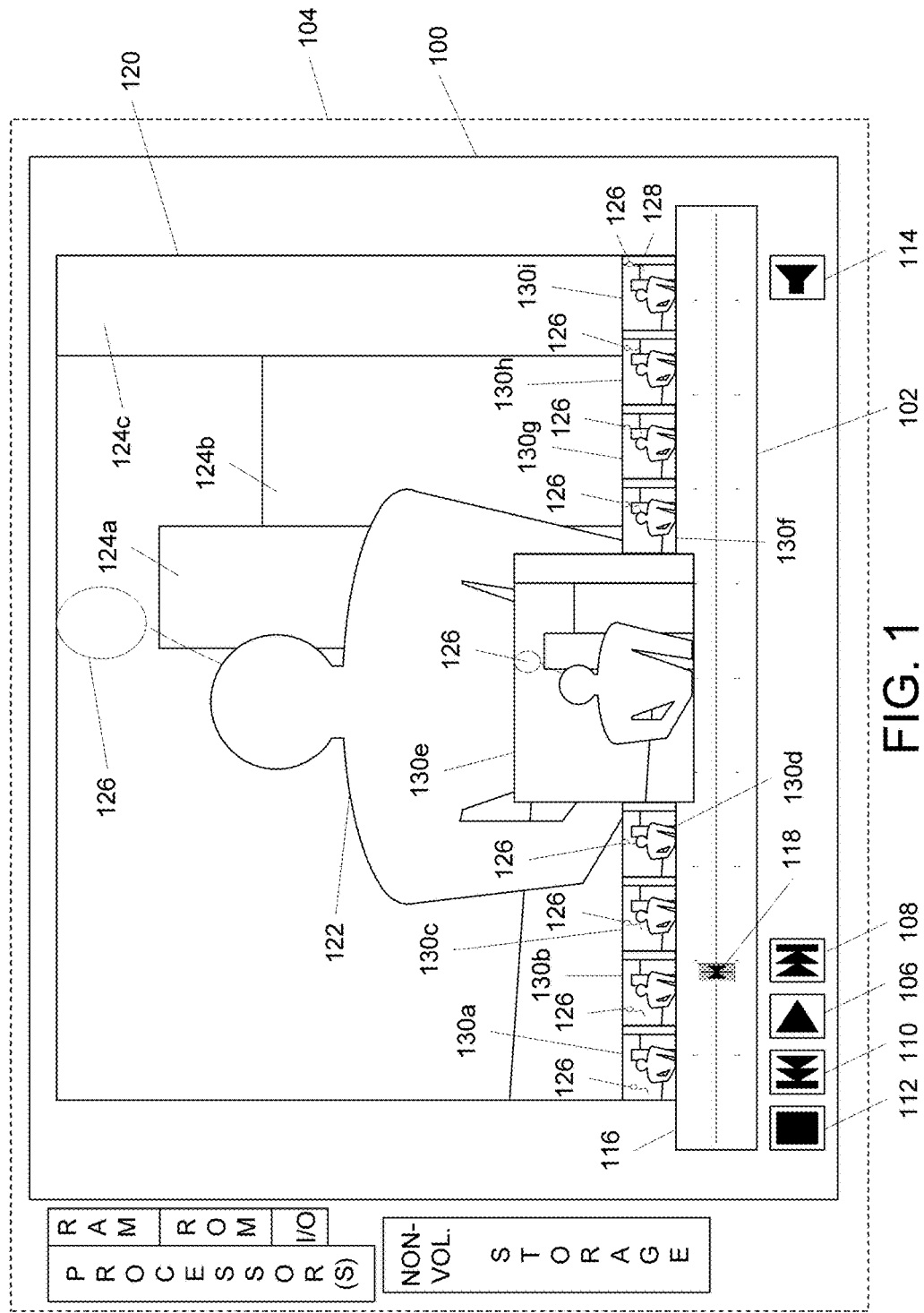
FIG. 1 shows, in simplified form, a simplified example of a conventional, prior art video player, having a user interface, running on a conventional processor-containing computer device.

This disclosure provides a technical solution to address the aforementioned problems inherent with the present capability for searching video content. Out technical solution improves upon current video players used on computer devices by analyzing video and generating a modified display that graphically identifies those frames of the video where a user-selected object appears and how prominent that object is in the respective frames. Further refinements of our technical solution allow for two or more objects to be selected and the modified display will indicate, depending upon the particular implementation and/or user selection, the frames where each appears and their prominence or some Boolean combination of those objects such that, for example, those frames where any of the objects appear is identified (e.g., a logical "OR" function), only those frames where all of the objects appear is identified (e.g., a logical "AND" function), or (in the case of two objects selected) only those frames where one or the other but not both appear (e.g., a logical "Exclusive OR" function).

Still further, implementations of our technical solution further improves current video players used on computer devices by allowing the analysis to occur across multiple videos selected by a user such that the user can select an object in a single video and the presence and prominence of that object in that video and other videos can be identified and displayed.

By dynamically creating and displaying this information the computer's ability to convey information about user identified content in a video and the computer's ability to interact with a user via a video player is improved.

Specifically, our technical solution to the above problem is implemented as a tool that is either added as an extension to the user interface of a video player, such as described above in connection with FIG. 1, or is incorporated into the implementation of a video player, and, in either case, operates to provide for better interaction between a computer and user with respect to video by, upon selection of an object or objects displayed somewhere in the video, automatically analyzing the frames of the to identify whether, and where, the particular specified object(s) (e.g., person(s) or thing(s)) are present in a video, and their prominence where present, and automatically dynamically generating a timeline display for the video containing the results of the analysis, without the user having to view the entire video.

The tool will typically be implemented in software using program code that is compatible with the particular video player with which it will be used, although for specialized devices, aspects of the tool and its function can be implemented in hardware. In addition, depending upon the particular implementation, the tool can be programmed to take advantage of specialized processing and/or rendering capabilities that may be provided by a specific graphic processing unit (GPU) that may be associated with, or contained within, the computer that will be running the video player itself.

Some implementations of our tool can further significantly enhance and transform the process of video search by operating across multiple videos in response to a user selection of particular object(s) in one video and providing a timeline display of whether, and where, any particular object(s) (e.g., person(s) or thing(s)) are present in each without having to individually view each.

As an initial matter, it is to be noted that digital video is currently produced in any number of formats and, in some cases, embedded in a particular format container. It is to be understood that the tool and operation described herein is intended to be applicable for use with digital video files having, for example, one of the currently used file extension such as: .aaf, .3gp, .asf, .wmv, .avi, .flv, .swf, .mkv, .mov, .mpeg, .mpg, .mpe, .mp4, .mxf, .nsv, .ogg, .rm, to name a few, as well as any other video file formats and containers that may be developed or become prevalent in the future.

In this application, for clarity, certain terms are to be understood to have the following definitions.

The term "frame" is to be understood to mean and encompass any time instance of digital video that can be viewed in a video player, without regard to actual correspondence to a conventional "frame" as that term would be understood for physical film or to a "cel" or "key frame" of traditional animation. Thus, interpolated video between two key frames can constitute a "frame" as defined and referred to herein.

The term "object" when used herein in connection with a video is intended to mean and encompass anything depicted or appearing within a frame of a video including, but not limited to, a person or a thing, whether or not it exists, or can exist, in the real world. For example, real people, structures and items are intended to be "objects" as defined herein, as is anything appearing in any type of cartoon or other "drawn" or animated image (e.g. characters, vehicles, items, speech or thought bubbles, lightning bolts, representations or manifestations of character powers or phenomena, etc.).

Also, the term "z-axis" is intended to indicate and mean an imaginary direction into the plane of the screen of the video player, a "z-axis position" is intended to mean a perceived depth of an object within the video, if what is displayed actually existed and was viewed in 3 dimensional space, and "prominence" is intended to mean an indication of the perceived position of the object within the video relative to the plane of the screen, with greater "prominence" being indicative of being closer to the plane of the screen and lesser "prominence" being indicative of farther distance from the plane of the screen.

Finally, it is to be understood that the instant tool is intended to be agnostic as to the presence or absence of any audio that may be associated with or synchronized to the video.

Now, by way of general operational overview, we extend the capability of a conventional video player so that a user can select an object appearing within a frame of a video, for example, by clicking/tapping on it in the video player, or by typing text specifying the object in a designated field. Upon doing so, in the case of text entry, the tool will correlate the text entry with an object in the video, using image identification software, to identify the selected object. The tool will then analyze the video to determine the video frames where the object occurs, and where on the z-axis the object is placed using object occurrence analysis and z-axis analysis. Then, a graphic will be rendered so as to show the frames in which the object is visible and concurrently represent its z-axis position within such frames. Moreover, as noted above, some implementations of the tool extend that capability further to allow a user to specify two or more videos and by selecting an object in one, the tool will automatically search that video and the other selected videos and generate and display a graphic indicating the presence and prominence of that object in all of the selected videos. With such implementations, a user need not view every video, or the entirety thereof, but can merely review some portion(s) of the specified videos that the tool identifies as containing the desired object(s). Moreover, at all times, the user can limit their review, if desired, to a further subset of the identified section(s) in which the object appears in a more prominent position within the video(s).

Figure 2:
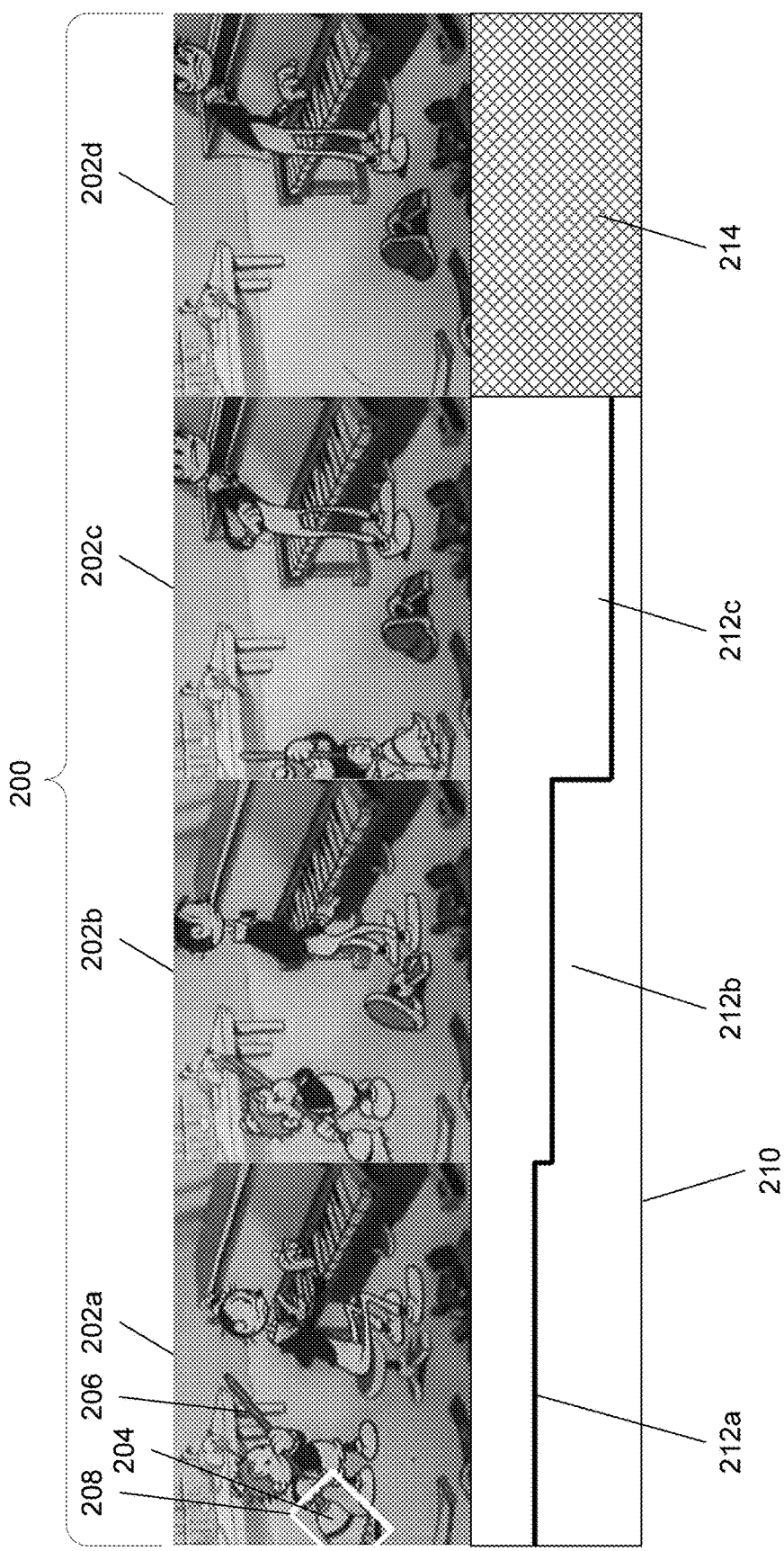
FIG. 2 represents, in simplified form, a portion of a cartoon that has been processed using an implementation of the tool described herein.

By way of simplified example, FIG. 2 represents, in simplified form, a portion 200 of a cartoon that has been processed using an implementation of the tool described herein. As shown, the portion 200 is made up of four frames 202a, 202b, 202c, 202d. The video has been analyzed as a result of a user's selection of the head 204 of the broom 206 in the first shown frame 202a, as indicated by the selection box 208. The results of that analysis is contained in the auxiliary timeline 210 presented, in this example, under the portion 200. As shown, the presence of the object, in this case the head 204 of the broom 206, is indicated by lines 212a, 212b, 212c in the frames 202a, 202b, 202c in which it appears. In addition, any frame 202d where the object does not appear is indicated, for example, by a cross hatched or grey area 214 in the auxiliary timeline 210 for that frame 202d.

More particularly, in this representation, the closer a line is to the bottom of the timeline 210, the more prominent (i.e., "forward") in the frame the object is. As such, it can be seen that, in the first frame 202a, the head 204 of the broom 206 is just over halfway into the "depth" of the frame 202a and so the line 212a in the timeline 210 indicating its presence is just over halfway to the top. In the next frame 202b, the head 204 of the broom 206 has moved forward a bit to about halfway into the "depth" of the frame 202b and so the line 212b in the timeline 210 indicating its presence is now about midway between the top and bottom of the timeline 210. In the third displayed frame 202c, the head 204 of the broom 206 is now substantially further forward, so the line 212c in the timeline 210 indicating its presence is shown nearly to the bottom of the timeline 210.

Figure 3:
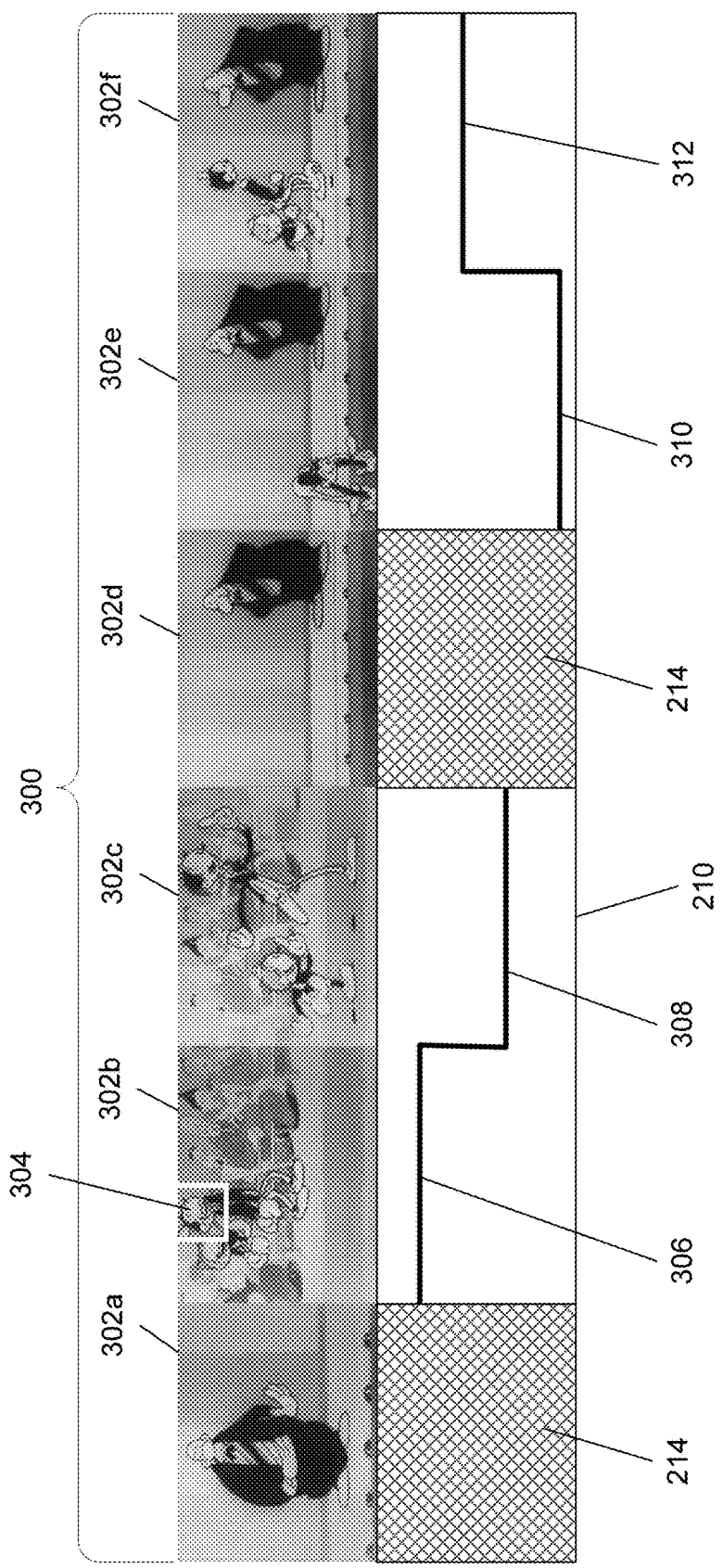
FIG. 3 represents, in simplified form, a different portion of the cartoon discussed in connection with FIG. 2.

In a similar vein, FIG. 3 represents, in simplified form, a different portion 300 of the cartoon discussed in connection with FIG. 2. As shown, the user has selected the face 304 of the tall lanky character. Through its object occurrence analysis, the tool has identified all frames where that character's face 304 appears, which includes four frames 302b, 302c, 302e, 302f of the six frames 302a, 302b, 302c, 302d, 302e, 302f of the cartoon shown in FIG. 3. Through z-axis analysis, the tool has also determined the prominence of that face 304 in each frame of the cartoon it is present and indicated it with lines 306, 308, 310, 312 in the timeline 210. As with FIG. 2, in FIG. 3, a cross hatched or grey area 214 is shown in the auxiliary timeline 210 for the range of frames where the face 304 does not appear.

With the foregoing general understanding, the details of various implementations for various parts of the tool will now be discussed.

Object Selection

Depending upon the particular implementation, a user selects an object to locate and track within a video using one of two methods, visual selection or textual search.

With visual selection, a user selects an object as it appears in a video, via the user interface, by selecting an object directly, for example, by clicking or tapping on it or by surrounding it using some form of selection tool, like a box, oval, freeform selection tool, etc.

With textual search, a user types the "name" of an object to track, for example, "ball," "hammer," "mouse," or "Mr. Kat." The tool will then check stored prior tool-generated metadata associated with that video to determine whether that "name" has previously been searched and, if so, the object to which it pertains. If that "name" has already previously been searched, in different implementations, different things can happen.

In some cases, the prior search will have previously caused the tool to locate the object and its prominence in the video and will have generated and stored metadata associated for that object "name" synchronized to the video such that it can merely be retrieved to generate and display the timeline for the user relating to that object and its prominence.

In cases where the "name" has not previously been searched, the tool will do one or more of the following, depending upon the specific implementation variant.

For some variants, it will require the user to go to some part of the video where the desired object appears, provide a descriptive "name" for the object, and, using a graphical selection tool identify the boundary of the desired object. From that point, the textual selection is transformed into an object selection and proceeds in that manner, but includes the specified "name" in the stored metadata for future use.

For other variants, where the user's computer has internet access, the tool can access the image search capability of a search engine, for example, the Google® search engine, and will conduct an image search on the internet corresponding to the "name" and use results of the image search to locate an object in the video frames that corresponds to the image that was returned by the search. Again, this may initially entail presenting image search results and asking the user to select one or more so that the tool can "learn" a correspondence between the "name" and images. For example, if the user typed the name of a cartoon character Mr. Kat, the tool might display a window containing thumbnail images of some of the image search results, which could include multiple images of, for example, actual cats, the cartoon characters Krazy Kat, Garfield the cat, and the desired "Mr. Kat" and ask the user to select one or more corresponding to the name "Mr. Kat." The tool would then use the selected image(s) as the object for the object search.

Irrespective of the manner in which an object is selected by the user, the selection triggers an automatic process that is functionally made up of two parts: (1) object detection (also called object search) analysis and (2) z-axis analysis.

Object Detection/Search Analysis

Once an object has been selected by a user, the tool searches the video for each frame where that object appears. Numerous algorithms and approaches for identification of an object in a video and tracking the object within the video (i.e. following its movement from frame to frame) presently exist, particularly for use in security applications, and thus can be straightforwardly used, or adapted for use, in a tool as described herein. Some representative examples include, but are not limited to, object identification and tracking techniques disclosed in U.S. Pat. Nos. 7,898,576, 7,391,907, 8,218,819, 8,559,670 and U.S. Pat. Pub. No. 2014/0328512, all of which are incorporated herein by reference in their entirety. Advantageously, such object identification and tracking techniques are useful because, in some cases, they can account for variations in the object due to, for example, rotation of the object or partial obscuring, and thus continue to track it, thereby improving the accuracy of the identified frames containing a selected object.

Our tool augments those known object identification and tracking techniques by maintaining a log of each frame where the object appears. Depending upon the particular implementation, the log can be created in non-volatile storage and then updated as the analysis progresses, it can be created in temporary storage until some specified part of the analysis is complete (which may be part or all of the object detection or search analysis, or may include some or all of the z-axis analysis as well) and then the log stored in the non-volatile storage. In any event, the information in the log resulting from the object detection or search analysis is then used as part of the z-axis analysis.

Z-Axis Analysis

Once the tool identifies each video frame that contains the object, those frames are further analyzed to determine the object's position on the z-axis (how close to the foreground or background it is). To do this, the tool compares the relative size of the selected object as it appears in the frame to other objects in the frame and the size of the object across all the frames in which it appears with the larger the object appears in a video frame being presumed to establish a position for the object "closer" to the front of the screen and the smaller the object is being presumed to establish a position for the object "farther into" the scene displayed on the screen. Likewise, the analysis may take into account changes in the placement of the bottom of the selected object relative to the bottom of the frame in conjunction with a change in the object's size as an indication of movement to or away from the front of the screen under the presumption that what is shown is always a perspective view.

The result of the z-axis analysis adds an indication in the log for each frame that can be used to graphically represent the prominence of the object.

At this point, it is to be understood that the result of this analysis is not to be taken as a specific indication of a distance for the object from the screen or an imputed distance if translated to the real world. Rather, at best, it is merely intended as an indication of relative prominence of placement within the "world" shown in that particular video and, in some cases, it may only be valid within a given "scene" of the video. For example, placement of an object within a room may be indicated as having the same z-axis location as the same object in a scene showing the object on a street, even though, if translated to the real world, the object would have very different actual distances from the plane of the "screen" in the two scenes.

Following the z-axis analysis, the identification of the frames in which the selected object appears and its prominence will have been determined, so he log file is updated and, if not previously stored, it is stored in non-volatile storage associated with the video. Depending upon the particular implementation of the tool and the type of file or its container, this may involve modifying the metadata file already associated with the video (i.e., creating a new "enhanced" metadata file) or creating an entirely new file that is associated with the video file that can be accessed by the tool.

Graphic Rendering of Results

At a point after the foregoing analysis is complete, which may be immediately thereafter or, if the current object selection corresponds to a previous object selection, at some point thereafter, the tool will access the information resulting from the analysis and use it to render a graphic, synchronized to the video that indicates each frame in which the selected object appeared and its prominence in those individual frames, and display that graphic for the user.

Depending upon the particular implementation, the rendering can be displayed in some portion of the video player screen, as an overlay on top of some portion of the video screen, or in an entirely separate area, for example, a separate window on the computer screen, the important aspect being what is shown, not where the graphic is shown.

Typically, the graphic rendering of the results will be presented in a timeline form, which may concurrently show the object-related information for the entire video or, if the video is too long, only a portion may be viewable at any given time. Alternatively, the tool may include the capability to expand or compress the timeline so that a greater or lesser number of frames is encompassed within it.

In any event, the graphic rendering is configured such that the user can recognize those frames where the selected object appears. This may be done in any suitable manner including, for example, using lines, dots, different thickness or patters of each, colors, color shades, etc., the important aspect being that an intelligible visual indication is presented to the user, not the manner in which the information is graphically presented or conveyed.

Depending upon the particular implementation and video player/tool combination, the user can then be presented with any one or more of several reviewing abilities. For example, with some implementations, the user can be given the ability to "play" the video after object selection and only those frames containing the selected object will be played (i.e., the player will jump past any frames that do not contain the object). With other implementations, the user will be able to use a slider (of the video player or separately provided by the tool) to scrub through the frames containing the selected object. With still other implementations, the user will have the ability to select a particular point in the graphic, as presented, which will enable them to go immediately to a particular frame within the portion of the video containing the object.

Figure 4:
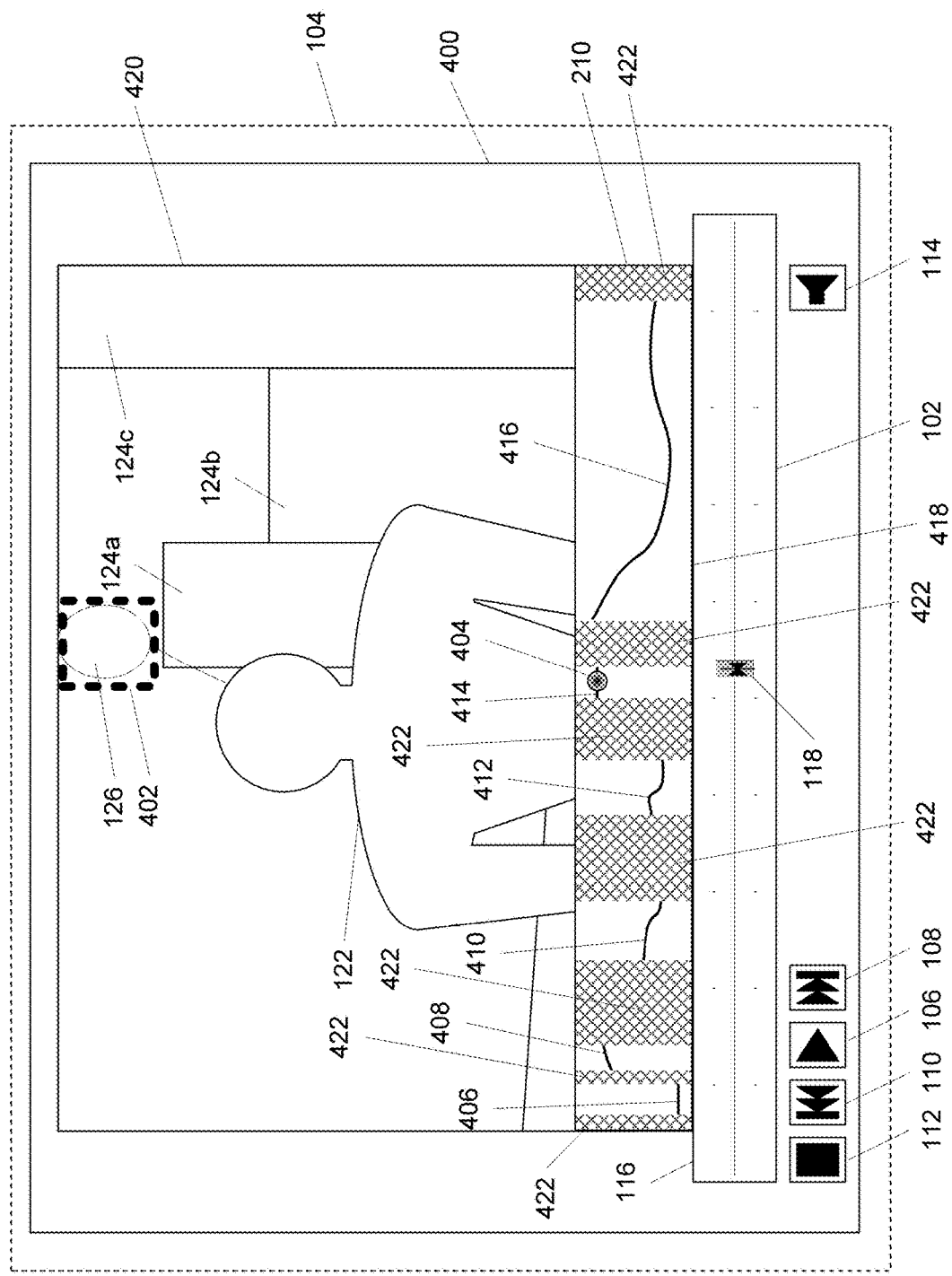
FIG. 4 illustrates, in simplified form, a video player similar to the video player of FIG. 1, except that it has been enhanced by the addition of a tool variant as described herein.

FIG. 4 illustrates, in simplified form, a video player 400, similar to the video player 100 of FIG. 1, except that it has been enhanced by the addition of a tool variant as described herein.

As shown, the video from FIG. 1 has previously been loaded and is paused such that the same frame from FIG. 1 is shown on the screen 420 of the video player 400. A user has selected the balloon 126 in that frame using a selection tool 402. As a result of the selection, the tool analyzed the video for the presence and prominence of the balloon 126 in the frames of the video and the results of that analysis have been rendered and are displayed in a timeline 210 contained within the screen 420 of the video player. Note that, in this particular example implementation, the timeline 210 replaces the timeline 128 of FIG. 1, although it could have just as readily been presented above that timeline 128 or in some other manner. As shown, the ranges of frames where the balloon 126 does not appear shown by cross hatching 422. In addition, the present frame is indicated in the timeline 210 by a dot 404 located on one 414 of the lines 406, 408, 410, 412, 414, 416 indicating the z-axis prominence of the balloon 126 in the frames of the video. As shown, with this timeline, the closer the line is to the bottom 418 of the timeline 210, the closer to the "screen" the object, in this case the balloon 126, is. Of course, this convention and the identification indicator is arbitrary. Other implementations could use the bottom 418 of the timeline 210 as representing the farthest distance from the "screen" an object can be, and still others could use some other visual indication.

In addition, with this implementation, the slider 118 and the dot 404 are linked so that moving the slider 118 back and forth will scroll back and forth through the video will cause the dot 404 to correspondingly move. If the slider is moved to a frame where the selected object does not appear, depending upon the particular implementation, it can cause the screen 420 to go blank or the slider can jump ahead to a position corresponding to the next frame where the selected object appears.

Figure 5:
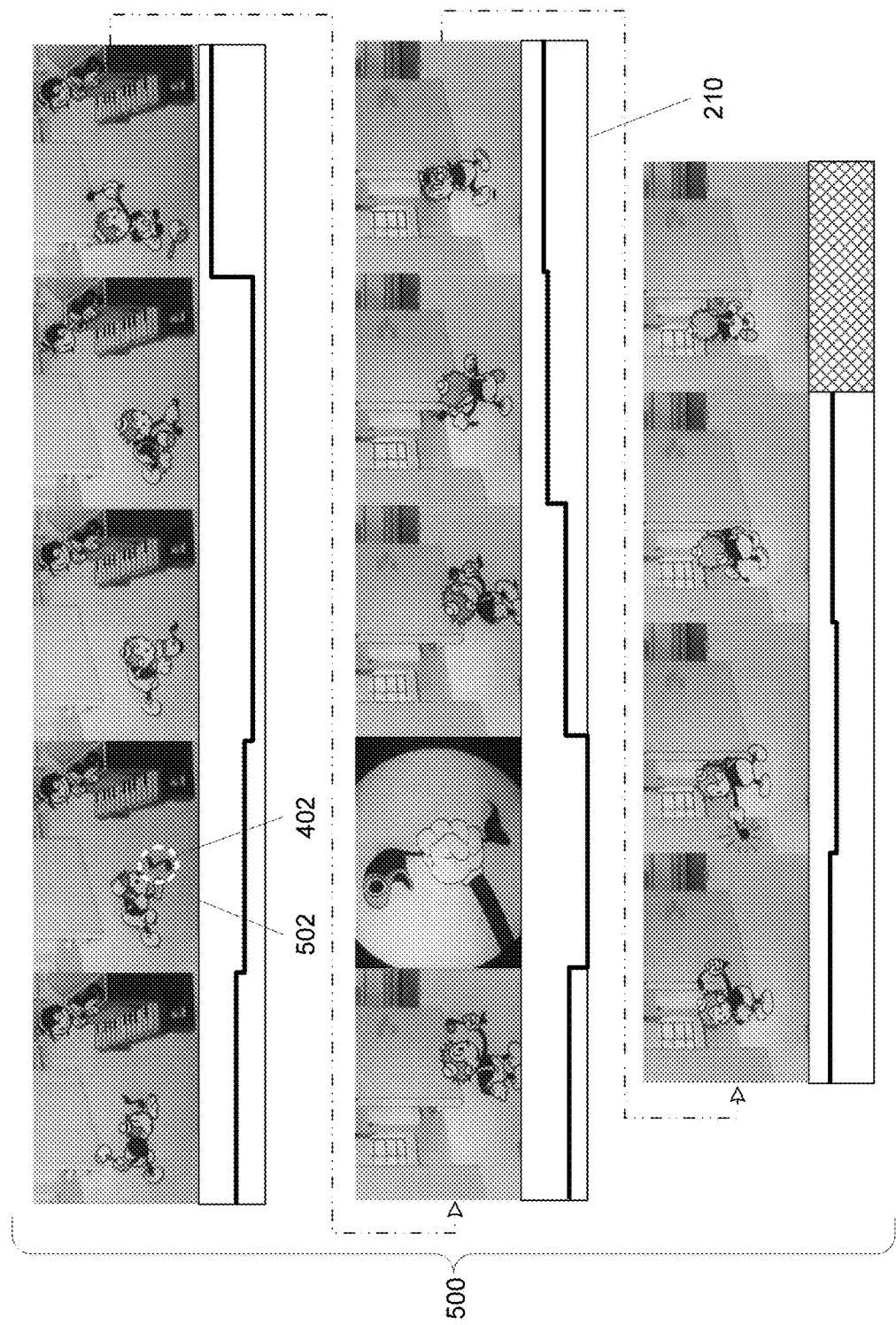
FIG. 5 illustrates, in simplified form, a representation of a portion of a video following analysis using one tool variant constructed as described herein.

As previously noted above, the use of the type of object identification and tracking algorithms allows the tool to take into account manipulations of the object (e.g., rotation, translation, partial obscuring, etc.) among frames. In this regard, FIG. 5 illustrates, in simplified form, a representation of a portion 500 of a video following analysis using one tool variant constructed as described herein, with the results of that analysis depicted in the timeline 210 spanning that range of frames. As shown, a user previously paused in one of the frames 502 and entered the text "musical note" in the user interface of the tool. This would have caused the tool to conduct an internet search of that phrase and, by image matching the search results with the frame contents, identify the object surrounded by the selection indicator 402. Based upon that identification, the presence and prominence of the selected object has been tracked and indicated for each frame by lines in the timeline 210, despite the note having been partially obscured, moved around over the course of the sequence 500.

Other Variants

Depending upon the particular implementation, further optional enhancements to the tool can be provided.

Figure 6:
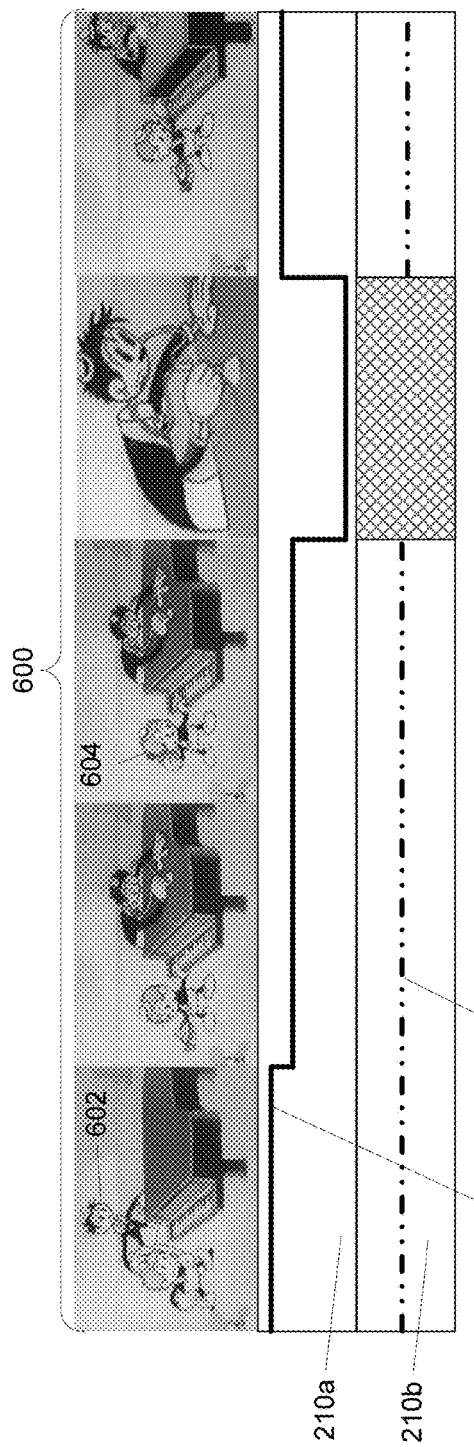
FIG. 6 illustrates, in simplified form, a portion of a video following analysis using one tool variant constructed as described herein, with the results of the analysis graphically presented underneath.

For example, some implementation variants can allow a user to specify more than one object. As such, those implementations can be configured to generate and present multiple timelines, one for each object selected. An example of this is shown in FIG. 6, which illustrates, in simplified form, a portion 600 of a video following analysis using one tool variant constructed as described herein, with the results of the analysis graphically presented underneath. As shown, the tall character 602 and the short character 604 have both been previously selected. As a result, the tool of this variant has generated two discrete timelines 210a, 210b. The upper timeline 210a indicates the presence and prominence of the tall character 602, in this case with a solid line 606, and the lower timeline 210b indicates the presence and prominence of the short character 604 by a dashed-dotted line 608. Alternatively, in other implementations, the lines in both timelines 210a, 210b could have had the same pattern and, in still other implementations, different color could have been used for the lines instead of, or along with, different patterns of lines for each object.

Other implementation variants supporting multiple object selection can be configured to allow for Boolean combinations involving the selected objects. Representative examples of this are shown in FIGS. 7A-7C.

Figure 7A:
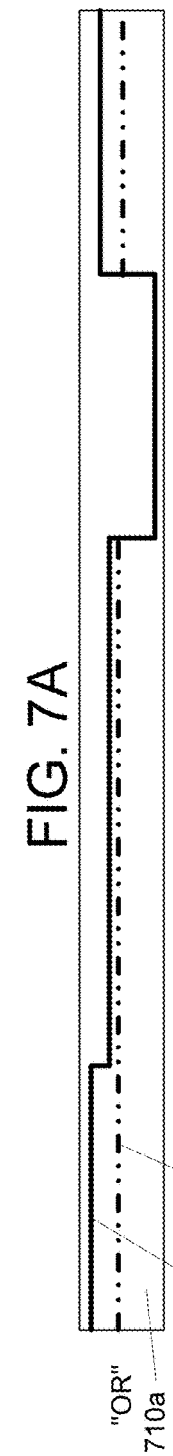
FIG. 7A illustrates, in simplified form, an example single timeline generated by an alternative variant tool, that implements Boolean combination of selections ("OR"), for the same video portion and selections of FIG. 6.

FIG. 7A illustrates, in simplified form, an example single timeline 710a generated by an alternative variant tool, that implements Boolean combination of selections, for the same video portion 600 and selections of FIG. 6. As shown, the timeline 710a contains lines 606, 608 indicating the result of applying a Boolean logical "OR" function to the selections.

Figure 7B:
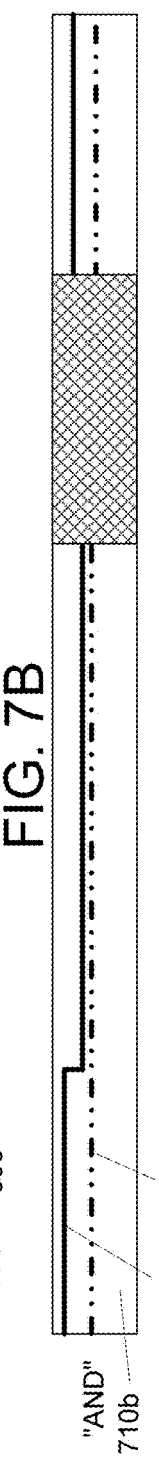
FIG. 7B illustrates, in simplified form, an example single timeline generated by an alternative variant tool, that implements Boolean combination of selections ("AND"), for the same video portion and selections of FIG. 6.

In similar manner, FIG. 7B illustrates, in simplified form, an example single timeline 710b generated by an alternative variant tool, that implements Boolean combination of selections, for the same video portion 600 and selections of FIG. 6. As shown, the timeline 710b contains lines 606, 608 indicating the result of applying a Boolean logical "AND" function to the selections.

Figure 7C:
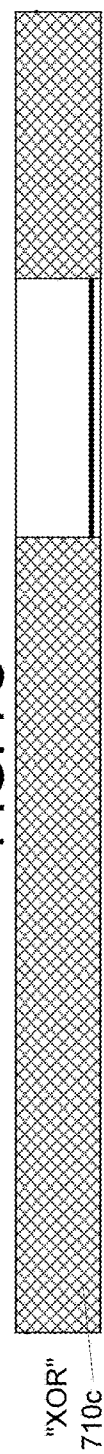
FIG. 7C illustrates, in simplified form, an example single timeline 710c generated by an alternative variant tool, that implements Boolean combination of selections ("XOR"), for the same video portion 600 and selections of FIG. 6.

Likewise, FIG. 7C illustrates, in simplified form, an example single timeline 710c generated by an alternative variant tool, that implements Boolean combination of selections, for the same video portion 600 and selections of FIG. 6. As shown, the timeline 710c contains only a line 606 as a result of applying a Boolean logical "XOR" function to the selections.

Now, it is to be appreciated that, in some cases, multiple instances of a selected object can appear in a single frame. With some variants, only the selected object is tracked by the tool and its presence and prominence may be shown in the generated graphic, irrespective of whether other instances of that same object may appear in the same frame(s). With other variants however, the tool may be configured to discern the presence of multiple instances of the same object and indicate, for each such given frame, each instance of the object and their prominence within that frame. In still other variants, where such instances may merge such that it is not easily possible to separately discern each, a different indication can be provided, for example, a change in thickness, color or pattern to indicate that at least two objects are present and have the same prominence or individual prominences that are too close to separately identify.

Figure 8:
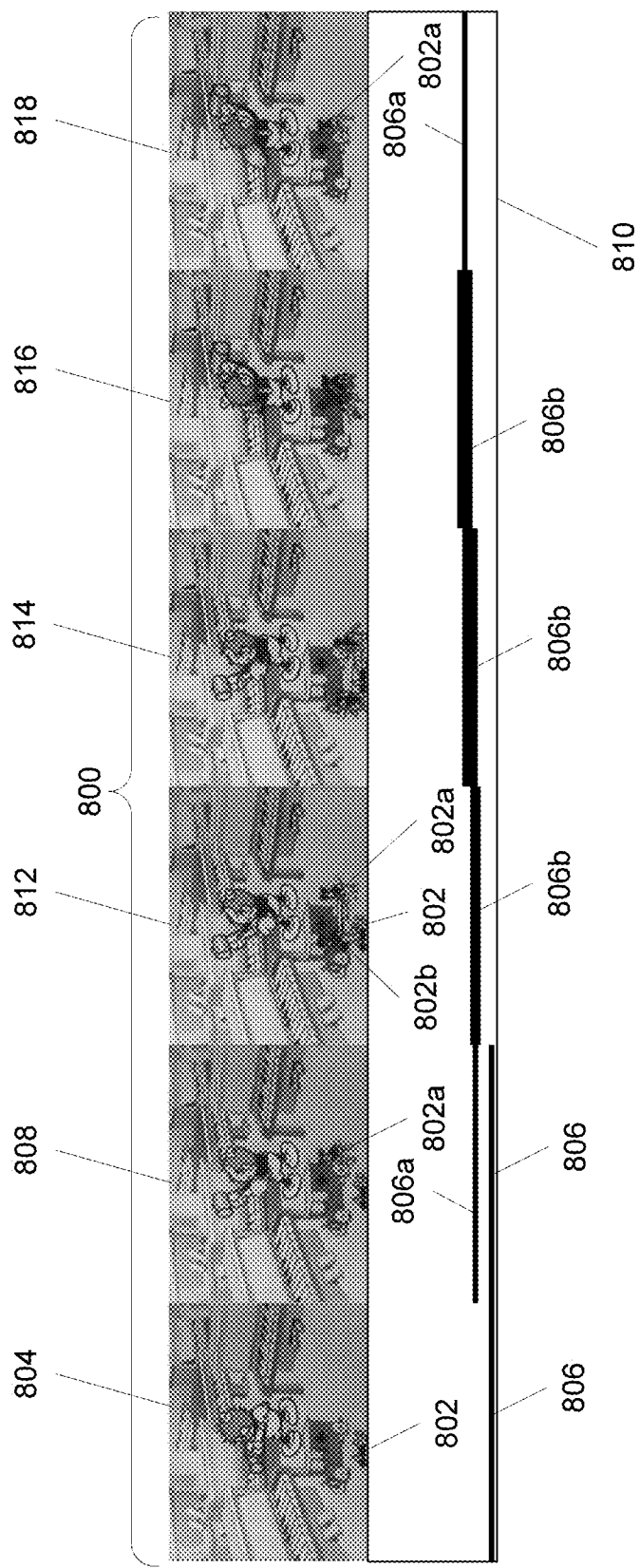
FIG. 8 illustrates, in simplified form, another portion of a video and an associated timeline as would be generated for that portion, after selection of a mouse, by a further variant of a tool constructed as described herein.

FIG. 8 illustrates, in simplified form, another portion 800 of a video and an associated timeline 810 as would be generated for that portion 800, after selection of a mouse 802, by a further variant of a tool constructed as described herein. In the first frame 804 shown, there is a single mouse 802 in the foreground, so that existence and prominence is indicated by a single line 806. In the next frame 808 however, an additional mouse 802a is present and has a different prominence. As such, a second line 806a is also displayed for that frame reflecting the presence and prominence of that mouse 802a. In the next frame 814, the two mice 802, 802a are so close together and a third mouse 802b is additionally present. As a result, the presence of the group of mice 802, 802a, 802b is indicated by a single thicker line 806b. This thicker line presence indication 806b continues in the next frame 816 but moves to reflect the change in prominence of the group of mice 802, 802a, 802b. In the final frame 818 of the portion 800, only a single mouse 802a is now present, so the presence indication 806a returns to the normal way of representing the prominence of a single object.

Multi-File Search Variants

As noted above, some variant implementations can be constructed such that, in addition to searching and generating a graphical display for a selected object in a video file, the search and generation can be conducted across multiple files.

Figure 9:
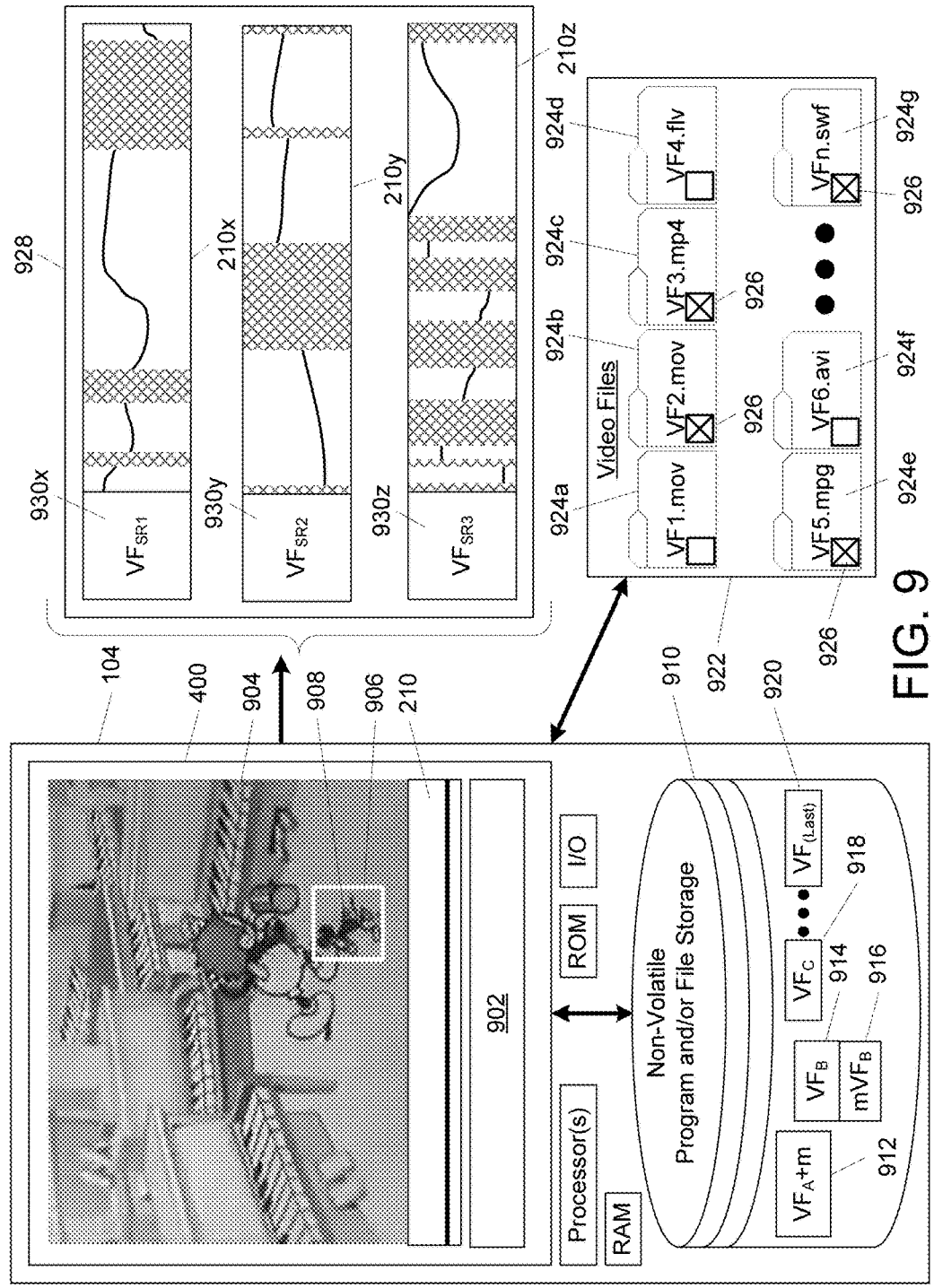
FIG. 9 illustrates, in simplified form, a computer running a variant of the tool described herein that is constructed so that it can perform searches across multiple files based upon a user selection of one or more objects.

FIG. 9 illustrates, in simplified form, a computer 104 running a variant of the tool described herein that is constructed so that it can perform searches across multiple files based upon a user selection of one or more objects.

The computer 104 has a video player 400 running on it that incorporates, or has an associated extension or add on that adds, the tool functionality described herein. As shown, the video player 400 includes interface controls 902, for example corresponding to those discussed in connection with FIG. 1 and/or FIG. 4. As shown, a video has been loaded into the video player 400 and been paused on a particular frame 904. As indicated by a selection box 906, a user has selected an object 908 shown in that frame for search. In addition, the user has indicated a desire for multi-file searching, for example, by for example, selecting a menu item, check box, radio button, or any other appropriate means. As a result, the tool causes the processor to access the non-volatile storage 910 to identify the video files contained therein. As shown, the storage 910 contains many video files, for example, a first video file 912, labeled in FIG. 9 "$VF_A$+m" to indicate that this video file has previously been searched, with the "+m" indicating that the resulting metadata is part of the video file or its container, a second video file 914, labeled in FIG. 9 "$VF_B$" and having an associated separate metadata file 916, labeled in FIG. 9 "$mVF_B$", a third video file 918, labeled in FIG. 9 "$VF_C$" as well as multiple other video files culminating in the video file 920, labeled in FIG. 9 "$VF_{(Last)}$", and which represents the universe of available searchable video files. With the simplest variant, that universe would automatically be searched. With other optional variants, the user can be given some control over specifying particular files to be searched and other files to be ignored.

In either case, those files are accessed and, in this representative optional example variant, the user is presented with a window 922 identifying the available video files 924a, 924b, 924c, 924d, 924e, 924f, . . . , 924g that can be included in the search. The user specifies which files to search by any provided appropriate method which, as shown, involves use of a check box. The user selects the specific files, which as shown, has involved the user selecting the check boxes 926 of at least the files named "VF2.mov," "VF3.mp4," "VF5.mpg," "VFn.swf" as indicated.

Depending upon the particular implementation, with some implementations (and possibly depending upon the capability of the particular computer 104), the tool will, for example, sequentially conduct the object identification search and z-axis analysis for each of the selected files, whereas, with other implementations, additional instances of the tool may be launched and rune in the background to conduct the object identification search and z-axis analysis for each of the selected files.

Upon completion of that analysis, the results of the search can be presented. Depending upon the particular implementation variant, this may involve some form of presentation for all of the selected files or may involve presentation for only those files where the selected object appears.

For purposes of example, with this example variant, only files containing the selected object(s) get presented. As such, the tool will cause the processor(s) to generate and display, in an appropriate interface 928, timelines 210x, 210y, 210z (indicating the location and prominence of the selected object as previously described) associated with some form of video file identifier 930x, 930y, 930z for each file that contained the selected object 908.

Thus, with this example and as a result of the multi file search, although the user selected at least four files to be included in the search for the specified object 908, exactly three files were found to also contain the selected object 908. Thus, the user could limit their review tot hose additional three files, whereas otherwise they would have had to potentially review at least the seven files identified in the selection window 922. Moreover, since the object identification search and z-axis analysis has already been conducted and the resulting information stored in the non-volatile storage associated with those three files, they can advantageously each be brought into the video player 400 and reviewed with respect to the selected object 908 without having to re-generate their timelines 210x, 210y, 210z.

Finally, it is worth noting that certain optional variants can be straightforwardly extended to be applicable to multi-file searching as well, for example, the Boolean search capability.

Finally, as a general matter, the aforementioned computer program instructions implementing the tool are to be understood as being stored in a non-volatile computer-readable medium that can be accessed by a processor of the computer to cause the computer to function in a particular manner. The non-volatile computer-readable medium may be, for example (but not limited to), an electronic, magnetic, optical, electromagnetic, infrared, or semiconductor apparatus, device, or propagation medium. More specific examples (a non-exhaustive list) of such computer-readable media include, but are not limited to, a portable computer diskette, a hard disk, a solid state disk, a random access memory, a read-only memory, an erasable programmable read-only memory (e.g., EPROM or Flash memory), an optical storage device, or a magnetic storage device. The computer usable program code may be transmitted to or accessed by the processor of the computer using any appropriate communication path including (but not limited to) wireless, wire line, optical fiber, etc.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computer-implemented method for dynamically creating and presenting video content information to a user of a computer having an associated screen, the method comprising:
   i) using a processor of the computer, loading contents of a video file into a video player, for display in a user interface of the video player on the screen;
   ii) displaying frames of the video file in the user interface;
   iii) receiving, via the user interface, a user's input indicating selection of an object displayed in at least one frame of the video file;
   iv) performing, using the processor, an object identification analysis of frames comprising the video file to locate each instance where a specific frame of the video file contains the object;
   v) for each specific frame of the video file that contains the object, performing a z-axis analysis of the object within the frame, using the processor, to determine prominence of the object within each specific frame;
   vi) storing metadata in non-volatile storage associated with the video file, the metadata indicating results of the object identification analysis and, for frames where the object was present, the z-axis analysis; and
   vii) using the processor, automatically generating and displaying for the video file, on the screen synchronized to the video file, a graphical timeline display for the user graphically reflecting frames of the video file containing the object and object prominence within those frames based upon the metadata.

2. The computer-implemented method of claim 1, further comprising:
   receiving, via the user interface, a user's selection of an additional object displayed in at least one frame of the video file;
   performing, using the processor, the object identification analysis of frames comprising the video file to locate each instance where specific frames of the video file contain the additional object;
   for each specific frame of the video file that contains the additional object, performing a z-axis analysis of the additional object within the frame, using the processor, to determine prominence of the additional object within each specific frame;
   storing additional metadata in non-volatile storage associated with the video file, the additional metadata indicating results of the object identification analysis pertaining to the additional object and, for frames where the additional object was present, the z-axis analysis; and
   using the processor, automatically generating and displaying graphics reflecting frames of the video file containing the additional object and additional object prominence within those frames based upon the additional metadata.

3. The computer-implemented method of claim 2, further comprising:
   performing a user-specified Boolean combination of the metadata and additional metadata, and
   wherein the graphical timeline display reflects a result of the Boolean combination.

4. The computer-implemented method of claim 1, wherein object prominence within an individual frame is indicated by a line.

5. The computer-implemented method of claim 4, wherein object prominence within the individual frame is reflected by proximity of the line to an edge of a part of the timeline corresponding to the frame.

6. The computer-implemented method of claim 1, wherein the user interface includes a slider, the method further comprising:
   synchronizing movement of the slider to movement of a prominence indicator within the graphical timeline display.

7. The computer-implemented method of claim 1, further comprising:
   indicating in the graphical timeline display a set of frames that do not contain the object.

8. The computer-implemented method of claim 1, wherein the receiving, via the user interface, the user's selection of the object comprises:
   receiving the user's selection of at least two objects; and
   wherein the graphical timeline display graphically reflects particular frames of the video file containing the at least two objects and their respective prominence within the particular frames.

9. The computer-implemented method of claim 8, wherein the graphical timeline display comprises a separate timeline for each of the at least two objects.

10. The computer implemented method of claim 1, further comprising:
    receiving an indication from the user that a multi-file search for the object is to be performed; and
    performing "iv)" through "vi)" for a set of video files.

11. The computer implemented method of claim 10, further comprising:
    presenting an interface to the user via which the user can specify video files that are to be the set of video files.

12. The computer implemented method of claim 10, wherein the set of video files corresponds to all video files stored in non-volatile storage accessible and displayable by the video player.

13. The computer implemented method of claim 10, further comprising:
    generating and displaying, for each file in the set containing the object, a timeline identifying presence and prominence of the object in each file oft he of the set where the object appears.

14. The computer implemented method of claim 1, wherein the user's input comprises:
    specifying the object by performing a graphical selection action within the user interface.

15. The computer implemented method of claim 1, wherein the user's input comprises:
    entering a textual input indicative of the object.

16. The computer implemented method of claim 15 further comprising:
    performing an image search based upon the textual input; and
    comparing results of the image search with contents displayed in the at least one frame of the video file to identify an intended object specified by the textual input.

* * * * *